Patented Mar. 11, 1941

2,234,367

UNITED STATES PATENT OFFICE 2,234,367

METHOD OF MANUFACTURE OF ACTIVATED MAGNESIUM OXIDE

Heinz H. Chesny, San Mateo, Calif., assignor to Marine Magnesium Products Corporation, a corporation of Delaware No Drawing. Application April 27, 1935, Serial No. 18,696

3 Claims. (Cl. 23—201)

This invention relates generally to the manufacture of a magnesium product having chemical and physical properties making it valuable for use in many industrial processes, as for example as a decolorizing and absorbing agent, or as a neutralizer and chemical reagent.

It is an object of the invention to provide a magnesium oxide product of the above character which will have better activated chemical and physical properties compared with magnesium oxides which have been produced in the past. More specifically, my product is capable of absorbing colored matter to a much greater extent than has been possible with decolorizing substances previously known, and it is also capable of simultaneously neutralizing acidity and removing colored matter.

Another object of the invention is to provide a process or method for the manufacture of my product, which will enable commercial production at a relatively low cost.

In carrying out the process of the present invention, I first produce a magnesium hydroxide slurry by the precipitation of magnesium hydroxide from brine solutions containing convertible magnesium salts. In this connection I prefer to utilize a method for the manufacture of magnesium hydroxide as set forth in my Patent No. 2,089,339. Briefly, the method disclosed in that application consists in reacting a suitable brine, such as ocean water, with a milk of lime containing lime in free solution. By proper control of the commingling of the milk of lime with the brine, as disclosed in said application, a highly hydrated form of magnesium hydroxide is precipitated in the form of flocks or agglomerates having a relatively high settling rate. Magnesium hydroxide precipitated in this manner is then filtered to form a viscous material of paste-like consistency, containing about 25% to 40% magnesium hydroxide. The viscous nature of the precipitate can be better understood by stating that, in a typical example, a suspension of the same in water has a viscosity of about 1.2 to 1.8 times that of water, where the suspension contains 5% solids.

The magnesium hydroxide obtained as explained above may contain considerable chlorides which, if permitted to remain, would obviate obtaining the desired activated characteristics in the final product. I therefore subject this material to purification by washing with water and by filtration, to the extent that the magnesium hydroxide on the dry basis contains not more than 0.7% and preferably less than 0.28% of chlorides, expressed as sodium chloride.

The paste produced as explained above is then reduced to dry powdered form, preferably by the use of a suitable spray dryer. The next step of the process is to convert the magnesium hydroxide powder to activated magnesium oxide by heat treatment, to a temperature of the order of at least about 400° C. It has been found that this step of the process can be carried out successfully by introducing the purified paste into an externally heated rotary kiln which is constructed and operated in such a manner as to heat the magnesium hydroxide under conditions of extreme uniformity. With a rotary kiln I have found that proper uniformity of heating can be obtained if the inner walls of the kiln are provided with longitudinally disposed baffles, so that during the heat treatment the material is repeatedly lifted and dropped through the central portion of the kiln. In practice, a calcining temperature of 750° F. has been found satisfactory, and to secure proper results the treatment is continued for a period of time sufficient to convert from 80% to 85% of the magnesium hydroxide content to magnesium oxide, the optimum percentage conversion being about 82.5%.

The product obtained by the process described above is a dry powder of relatively small particle size. The sodium chloride content does not exceed 1.0% and is preferably below 0.4%. A typical analysis is as follows:

| | Per cent |
|---|---|
| Magnesium oxide | 70.84 |
| Magnesium hydroxide | 14.38 |
| Magnesium carbonate | 8.78 |
| Magnesium sulphate | 1.36 |
| Calcium carbonate | 3.42 |
| Iron and aluminum oxides | 0.2 |
| Silica | 0.52 |
| Sodium chloride | 0.3 |
| Undetermined | 0.2 |

My product has high chemical and physical activity compared with magnesium oxide such as has been produced in the past. With respect to its ability to absorb coloring matter, generally the product possesses from five to ten times the absorptive power of Florida earth, bentonite, or fuller's earth. For example, in one test a Texaco red engine oil having a No. 5½ color (according to "Proceedings American Society for Testing Materials" 1923, part I, page 677 (A. S. T. M. D–155–23T)), was treated by agitating together with the magnesium oxide at a temperature of 212° F. for five minutes, using one-half pound of my product per gallon of oil. This treatment resulted in an oil having No. 3½ color. Under the same conditions, an equal amount of Florida earth reduced the color to No. 5¼; fuller's earth to No. 5; bentonite to No. 4¾; and activated charcoal to No. 4. In another test upon the same oil, and under the same conditions, with two pounds of my product per gallon of oil, the color was reduced to a No. 2¼; with one pound of my product per gallon of oil, the color was reduced to No. 3; and with one-tenth of a pound of my product per gallon of oil, to No. 4¾. Reduction of the color of this oil to No. 4¾, with bentonite, required one and one-half pounds of bentonite per gallon of oil.

I have found that the characteristic of my product as pointed out above, namely, its high activity in absorbing colored matter, can be utilized to advantage in many industrial processes where it is desired to decolorize various materials. For example, in addition to the oil industry, my product can be utilized to advantage in the sugar industry for absorbing undesired color from sugar solutions. In addition to possessing the physical property of being highly effective to absorb colored matter, my product also has activated chemical properties, particularly with respect to neutralizing acidity. In this connection, my product may function in many industrial processes to simultaneously neutralize acidity and absorb colored matter.

With respect to the features of my process to which the activated properties are attributable, it may be stated in general that while the use of hydrous magnesium hydroxide results in a product of greater activity than the use of magnesium hydroxide having little if any water of hydration, the more critical phase of the process seems to be the conversion by heat treatment. The use of extremely high calcining temperatures or substantially complete conversion of the magnesium hydroxide will not impart the desired properties. According to my observations, the activity has a pronounced peak, corresponding substantially to the conversion range previously specified, provided the heat treatment is carried out with due regard to uniformity of heat distribution and temperature of conversion, by the use of equipment such as described, or equivalent means.

Reduction of the sodium chloride content is not merely for the purpose of securing a purer product, but it serves to avoid detrimental effects upon the activity of the oxide, which have been found to result when such material is present in excessive amounts during conversion.

Activated magnesium oxide made as described herein, will afford an iodine number substantially in excess of 60. The term "iodine number" as used herein is an index of the adsorptive properties of the material. It can be defined as being 100 times the milligram equivalents of iodine removed from an iodine solution by one gram of activated material. In carrying out a test to determine iodine number, one makes use of a solution of iodine with carbon tetrachloride, and the solution should contain an ample amount of iodine so that removal of some iodine by the magnesium oxide does not affect further adsorption.

I claim:

1. In a method of manufacturing activated magnesium oxide, the steps of spray drying a paste of hydrous magnesium hydroxide to form a powder, and then effecting relatively uniform heating of the power to a temperature of about 750° Fahrenheit for a period of time sufficient to convert from 80 to 85% of the magnesium hydroxide content to magnesium oxide.

2. In a method of manufacturing activated magnesium oxide, the steps of spray drying a paste of hydrous magnesium hydroxide to form a powder, and then heating the powder to a temperature of at least 400° C. for a sufficient time to raise the iodin absorption number of the product to a value in excess of 60.

3. In a method of manufacturing activated magnesium oxide from hydrous magnesium hydroxide which has been precipitated from brine containing convertible magnesium salts and sodium chloride, the steps of washing the precipitate to reduce the sodium chloride content to 0.7% or less of the magnesium hydroxide, spray drying the precipitate, and then heating the spray dried material to a temperature of at least 400° C. for a sufficient time to raise the iodin absorption number of the product to a value in excess of 60.

HEINZ H. CHESNY.